(No Model.) 2 Sheets—Sheet 1.

C. B. COOK.
SHEEP HOLDING DEVICE.

No. 266,016. Patented Oct. 17, 1882.

Witnesses
Geo. H. Strong

Inventor
Clairessa B. Cook
By Dewey & Co.
Attorneys (No Model.) 2 Sheets—Sheet 2.

C. B. COOK.
SHEEP HOLDING DEVICE.

No. 266,016. Patented Oct. 17, 1882.

Witnesses,
Geo. H. Strong.
L. H. Krouse

Inventor,
Clarissa B. Cook
By Dewey & Co.
Attorneys

UNITED STATES PATENT OFFICE.

CLAIRESSA B. COOK, OF SAN FRANCISCO, CALIFORNIA.

SHEEP-HOLDING DEVICE.

SPECIFICATION forming part of Letters Patent No. 266,016, dated October 17, 1882.

Application filed July 25, 1882. (No model.)

*To all whom it may concern:*

Be it known that I, CLAIRESSA B. COOK, of the city and county of San Francisco, State of California, have invented a Sheep-Holding Device; and I hereby declare the following to be a full, clear, and exact description thereof.

My invention relates to a device which is principally useful for holding sheep while they are being sheared.

It consists of standards having collars so hinged to them that they may be opened and clasped around the neck and the hind legs of the animal respectively, and thus hold it firmly while being operated upon.

Figure 1:
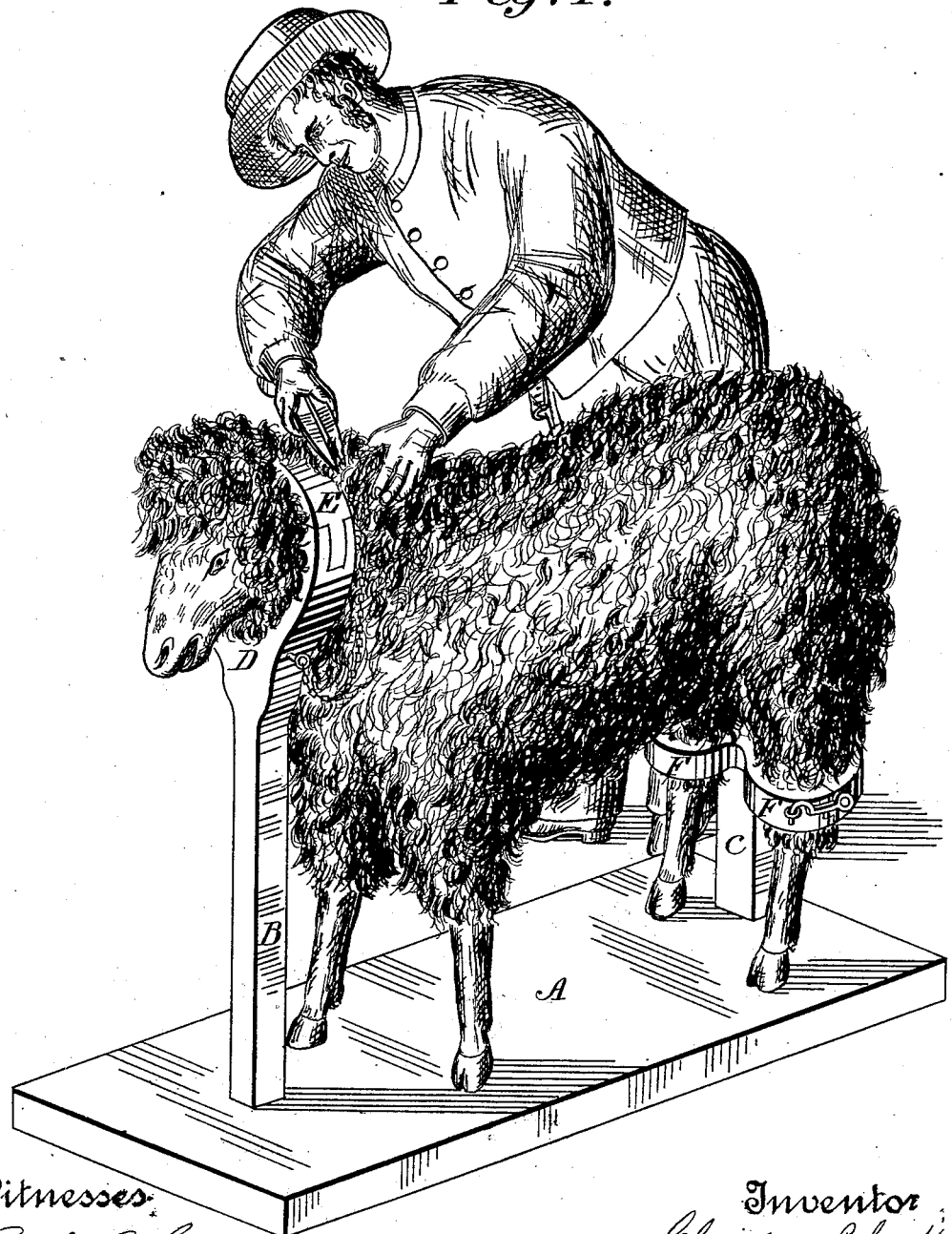
Figure 2:
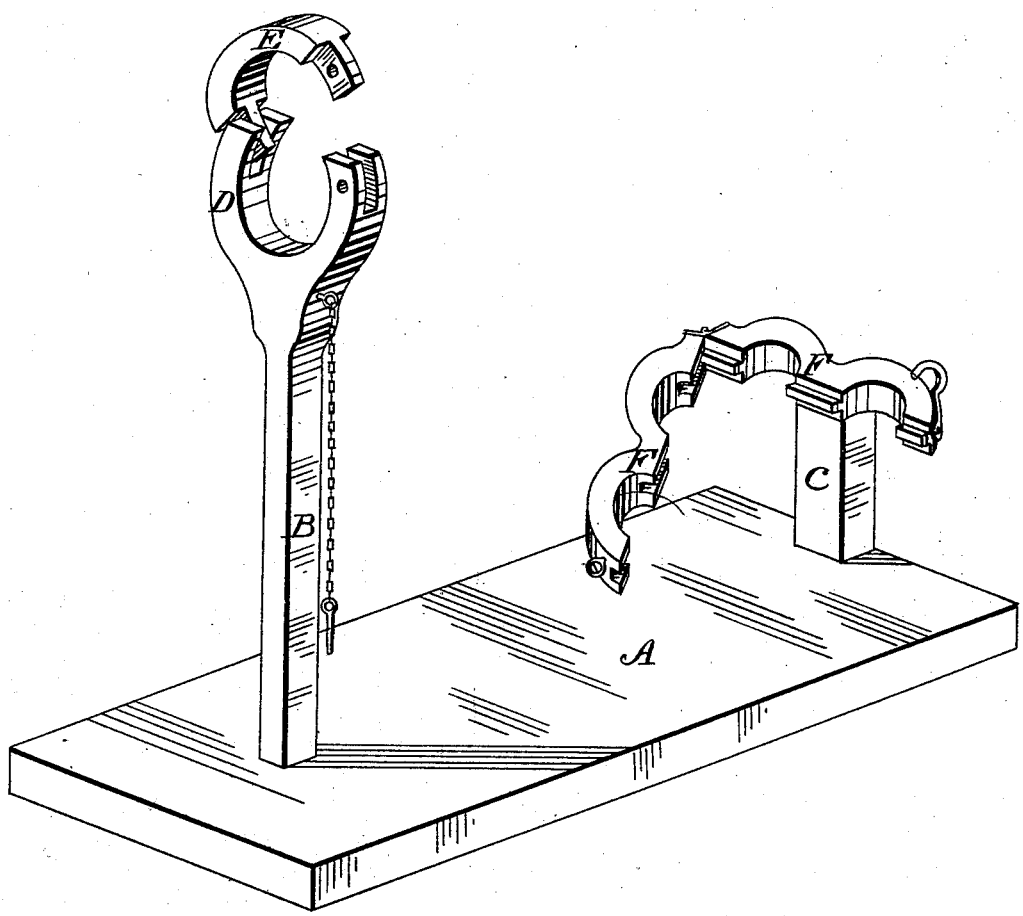

Referring to the accompanying drawings for a more complete explanation of my invention, Figure 1 is a perspective view showing application of my device. Fig. 2 is a perspective view showing collars open.

A is the base, which may be of wood or flooring; or if the device is to be used a great deal in one place a separate base may be dispensed with, and the standards may be fixed in the ground.

B is the front and C the rear standard. The front standard is made of a suitable height to hold its collar at the height of the animal's neck, and, if desired, it may be fitted to be adjusted or slide up and down for this purpose.

The collar is composed of two parts, D and E. The part D is rigidly fixed to the top of the standard B, and the part E is hinged to one side of it, so as to close over the animal's neck and be secured by a snap or catch. The standard C has a clasp or collar, F, of similar construction, fixed horizontally upon the upper end, and at such a height that the collars will just clasp the hind legs above the gambrel-joint. This holds the hind legs perfectly still, and the collar upon the standard B holds the neck of the animal, so that but little movement is possible, and none which will do any damage. Shearing or other operations may then be carried on rapidly and safely without injury to the animal or trouble to the operator.

Having thus described my invention, what I claim as new, and desire to secure by Letters Patent, is—

A device for holding sheep and other animals, consisting of the fixed standards B and C, having the sectional hinged collars D, E, and F fixed to their upper ends, all arranged substantially as herein described.

In witness whereof I hereunto set my hand.

CLAIRESSA BENNETT COOK.

Witnesses:
L. H. NOURSE,
G. W. EMERSON.